Dec. 3, 1929.          B. MILLER          1,737,725
PHOTOGRAPH CASE
Filed Oct. 7, 1927

Inventor
Benjamin Miller
By Chapman Ferguson
Attorney.

UNITED STATES PATENT OFFICE

BENJAMIN MILLER, OF BALTIMORE, MARYLAND

PHOTOGRAPH CASE

Application filed October 7, 1927. Serial No. 224,560.

This invention relates to improvements in photograph cases and is especially adapted for the use on automobile wheels.

The invention consists of the novel construction and arrangement of the parts and combination of the parts hereinafter more fully set forth in the following specification and pointed out in detail in the appended claim.

In the accompanying drawing—

Figure 1:
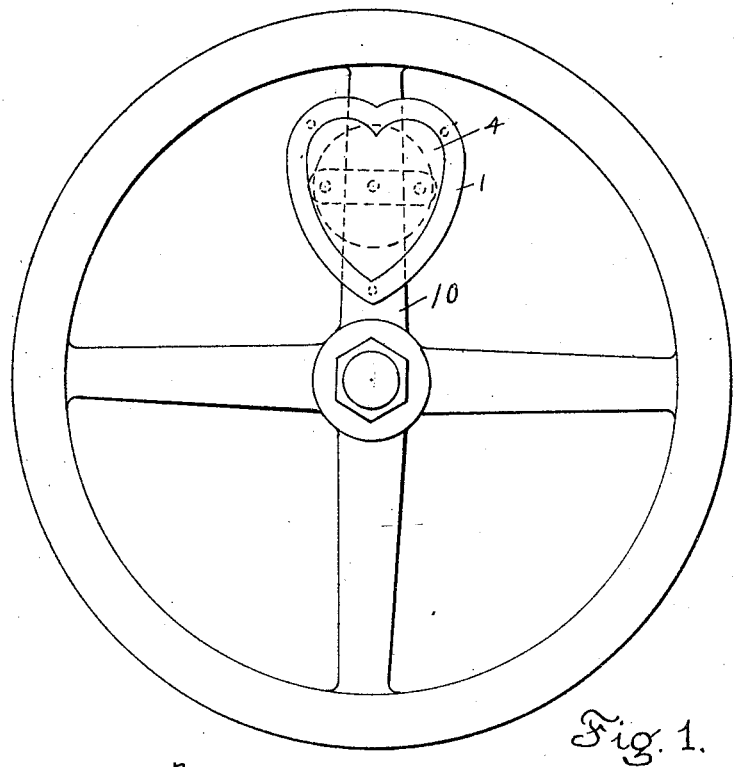
Figure 1 is a plan view of the automobile wheel showing my invention applied thereto.
Figure 2:
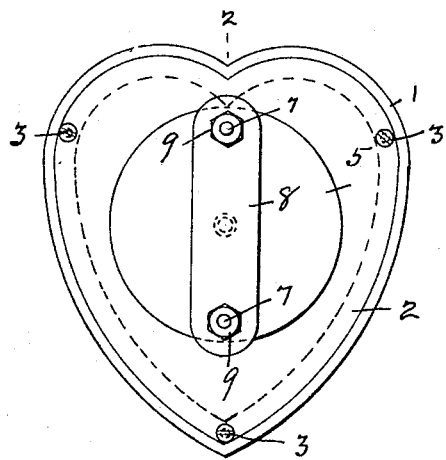
Figure 2 is a detail plan view of the case.
Figure 3:
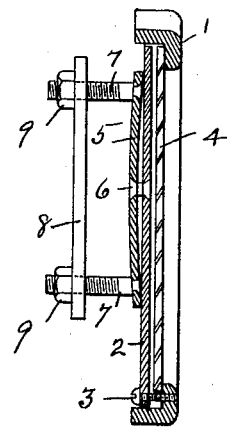
Figure 3 is a vertical section on the line 2—2 of Figure 2.

Referring to the accompanying drawing forming part of this specification and in which like reference numerals designate like parts throughout the several views thereof 1 designates the outer flanged rim of the case, 2 the base plate to which the said flanged rim 1 is secured by means of the screws 3. Between the base plate 2 and the flanged rim 1 is a glass plate 4 which covers the photograph (not shown). To the rear of the base plate 2 is a plate 5 pivotally secured thereto at 6, the said plate 5 being slightly bowed so that its outer edges will be held securely against the plate 2 by friction. Extending from the rear of the plate 5 are threaded lugs 7 adapted to receive the cross bar 8 which latter is held in position by the nuts 9.

It will thus be seen that the flanged rim 1 can be removed by unscrewing the screws 3 and the photographs placed between the glass plate 4 and base plate 2, and the rim 1 again secured in position. The device can then be placed on one of the bars 10 of an automobile wheel with the threaded lugs 7 placed on each side of bar 10 and the plate 10 placed tightly under the bar 10 thereby holding the case in position on said wheel. By having the plates 5 and 2 pivoted the case can be turned in such a position that the photograph will be held in a vertical position whenever the car is running straight, no matter in what position the bar of the automobile wheel may be inclined. By having the plate 5 bowed there will be friction enough between the plates 2 and 5 to hold the case in whatever position it may be set.

Having thus described my invention what I claim is:—

A photograph case comprising a base plate, a rim removably secured to said base plate and having an inwardly extending flange projecting beyond the said base plate, a bowed plate pivoted at center to said base plate and having its upper surface at its outer ends in frictional contact with the base plate, threaded lugs projecting from the rear of said bowed plate, a cross bar adapted to fit over said threaded lugs, and means for holding said bar in position on said lugs.

In testimony whereof I affix my signature.

BENJAMIN MILLER.